July 15, 1958 F. WERNER 2,843,001

OPTICAL TILT CORRECTING DEVICE

Filed June 11, 1956

United States Patent Office 2,843,001 Patented July 15, 1958

2,843,001

OPTICAL TILT CORRECTING DEVICE

Friedrich Werner, Berlin-Nikolassee, Germany, assignor to Askania-Werke A. G., Berlin-Friedenau, Germany, a corporation of Germany Application June 11, 1956, Serial No. 590,539

Claims priority, application Germany July 2, 1955

4 Claims. (Cl. 88—1)

This invention relates to an optical device having a ray displacement system forming part of its ray trace, with a swingably suspended ray displacement element forming part of the system; the swingable suspension being used in order to maintain a high degree of precision in the reading of altitude or other data, even in the event that the position of the optical device changes slightly while the instrument is being used. The invention improves such a system by eliminating a conflict between optical accuracy and mechanical ruggedness which existed in prior constructions.

The swingably suspended element, the exact operation of which will be described hereinafter, provides the utmost of precision only when suspended on filaments of extreme thinness. These, however, are very susceptible of being injured by mechanical loads such as those due to shocks incident to the transportation, rigging and taking down of the device, which can never be avoided completely. Shocks and vibrations and the like, arising from such and similar causes, may deform and sometimes even rupture the suspending filaments. It is the object of this invention to eliminate this danger.

This has been achieved, without impairment of accuracy and other features of the instrument, by incorporating resiliently yieldable means in a certain area; particularly, between the pendulum forming part of the swinging suspension of an optical element, on the one hand, and a part rigid with the device, on the other hand. More particular and preferred features of the way in which the resilient element is located and formed will be described hereinafter.

Figure 1:
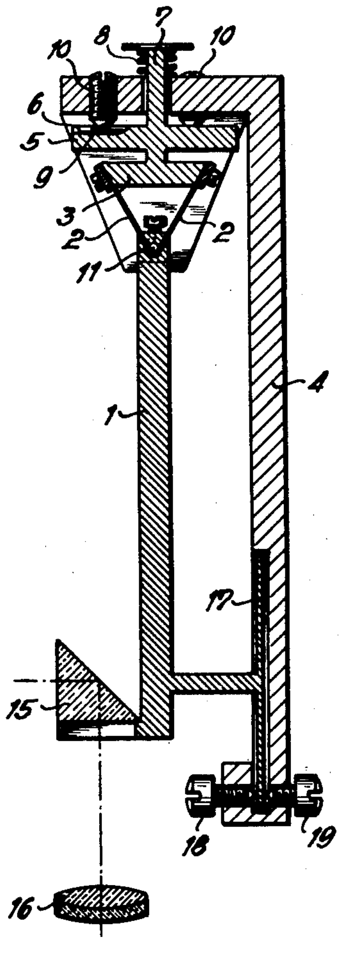
Figure 2:
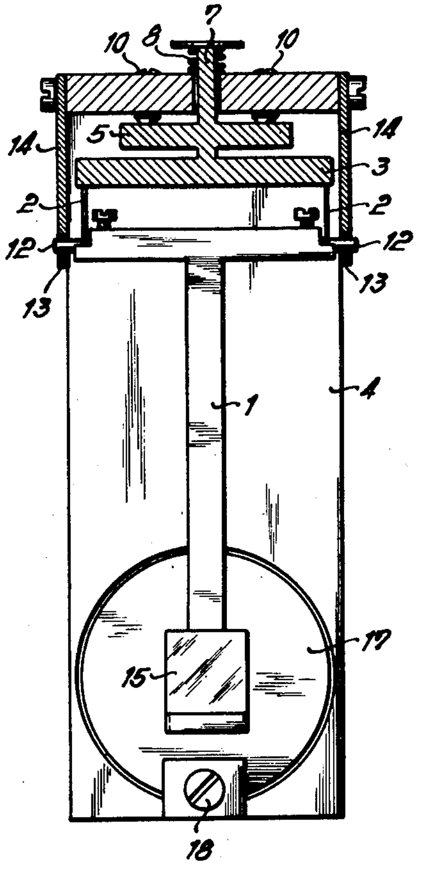

In the drawing, Figure 1 is a cross-sectional elevation of a deflector suspension system according to this invention and Figure 2 is a front view of the system. The illustration is purely diagrammatic and is limited to the parts directly involved in the automatic correction of the reading of the device upon a slight change of position of the device.

A pendulum 1 is suspended on filament means, such as threads or ribbons 2, which as mentioned are made as accurate as possible and accordingly as fine and delicate as possible, so that they require protection even in case that the instrument receives merely a slight shock. These filaments are, in their upper parts, secured to a tilting bar 3, which according to the invention is resiliently mounted in the rigid frame 4. For this purpose the particular tilting bar 3 as shown is rigid with a disc 5, the top surface of which has three bearing grooves 6 recessed into it, at angles of 120 degrees to one another. The bar 3 and disc 5 are also rigid with an upwardly extending stud 7, which extends freely through a suitable bore in frame 4. The aforementioned resilient mounting, in the embodiment shown, is provided by a spring 8 which biases the stud 7, bar 3 and disc 5 upwardly and against the points 9 of three set screws 10 held in frame 4 and seated in bearing grooves 6. Thus the fulcrum means for the deflector pendulum is no longer fixed to the device, as heretofore, but undergoes vertical shifting relative to the device, upon a shock. The dimensions of spring 8 are such that the spring force amounts only to a fraction of the tensile strength of the pendulum supporting filaments 2. In this manner, vertical loads or load components which otherwise would be applied to the filaments, are absorbed by the spring.

Analogously, of course, different loads or load components can be absorbed. Likewise the vertically resilient suspension means can be modified in various ways, for instance by incorporating resiliency in parts more directly functioning as suspension means for the pendulum, such as an element between suspending filaments used in series, or in some or all of the filaments themselves which may be formed as coil springs, or replaced by horizontally tensioned wires or the like.

The filaments 2, shown as arranged in V-shape, support the fulcrum pin 11 of the pendulum 1. This pin has a pair of terminal portions 12 extending into bores 13 of braking plates 14, rigid with frame 4; said bores being slightly larger than said portions of the pin and being normally out of contact therewith.

At the lower end of the so suspended and controlled pendulum there is provided a prism 15 which serves as optical deflector means and also as pendulum weight. It forms part of the ray trace of the telescope sight or reading system for the reading of a theodolite altitude circle or the like; this system being shown only in part by lens 16 which may be the objective of the theodolite. As known from other disclosures, the use of the optical device may start by exactly horizontally focussing upon a fixed point, by means including the elements 15, 16 among others; and the system including these elements may then read exactly a value such as 90 degrees on an altitude circle. If the theodolite then tilts by a small angle and the axis is then readjusted to accurately horizontal position by refocussing upon the fixed point, the circle rotates to a slight extent, tending to introduce an error into the reading, which however is compensated by the swinging ray deflector system.

The swinging of the system may be damped by a dashpot 17 and limited by set screws 18, 19.

When the theodolite is at rest, mechanically, the pendulum 1 hangs freely on the threads or ribbons 2 and the axle members 12 project freely into the bore holes 13 without contacting their walls. When, on the other hand, an impact upon the theodolite occurs, for instance during the moving or setting up of the device, the spring 8 yields, the force of this spring being feeble and being only a fraction of the slight tensile strength of the sensitive ribbons 2. As a result the disc 5 loses contact with points 9 and moves until the axles 12 reach contact with the walls surrounding holes 13, thereby limiting the movement of the pendulum in downward direction and protecting the filaments from an excessive load. As soon as the impact ceases the spring 8 returns the disc 5 so that the bearing grooves 6 again contact the points 9 of set screws 10, reestablishing the proper position of the pendulum.

I claim:

1. In an optical device such as a theodolite, an imaging system and a tilt-correcting system for the same, said correcting system comprising: a small pendulum; an optical deflector rigidly mounted on a free end portion of the pendulum for deflecting the ray trace of said imaging system; a first frame structure, rigidly mounted in said device; a second frame structure, resiliently supported from the first frame structure; delicate pivot means normally suspending the pendulum from the second frame structure for swinging movements of the pendulum to modify said deflecting of the ray trace; auxiliary support means for the pendulum on the first frame structure, less delicate than said pivot means, said auxiliary support means being normally not in supporting relation to the pendulum; and resilient means mounted on the first frame structure for said resilient supporting of the second frame structure, said resilient means normally holding the second frame structure to the first to render the delicate pivot means operative and the auxiliary support means inoperative but being so constructed and mounted that on an impact against the device the second frame structure is released from the first to render the delicate pivot means inoperative and the auxiliary means operative.

2. In a device as described in claim 1 the feature that said resilient means is a spring normally raising the second frame structure against the first.

3. In a device as described in claim 1 the feature that said delicate pivot means comprises a system of flexible, elongated elements, normally suspending the pendulum.

4. In a device as described in claim 3 the feature that said resilient means is a spring the force of which amounts to a fraction of the tensile strength of said flexible elements.

References Cited in the file of this patent

UNITED STATES PATENTS

| | | |
|---|---|---|
| 1,563,934 | Sperry | Dec. 1, 1925 |
| 1,858,384 | Andre | May 17, 1932 |
| 1,883,655 | Eskilson | Oct. 18, 1932 |
| 2,593,946 | Craft et al. | Jan. 10, 1950 |
| 2,679,181 | Keuffel et al. | May 24, 1954 |